United States Patent [19]

Dorr

[11] Patent Number: 4,914,641

[45] Date of Patent: Apr. 3, 1990

[54] ULTRASONIC MEASURING DEVICE AND METHOD

[75] Inventor: John A. Dorr, Crofton, Md.

[73] Assignee: Xecutek Corporation, Md.

[21] Appl. No.: 269,613

[22] Filed: Nov. 10, 1988

[51] Int. Cl.$^4$ ............................................. G01S 15/00
[52] U.S. Cl. ....................................... 367/99; 367/902; 367/905
[58] Field of Search ................. 367/902, 905, 99, 173, 367/188; 181/177, 192; 73/497, 292

[56] References Cited

U.S. PATENT DOCUMENTS

| | | | |
|---|---|---|---|
| 4,264,788 | 4/1981 | Keidel et al. | 367/902 |
| 4,576,286 | 3/1986 | Buckley et al. | 367/902 |

*Primary Examiner*—Thomas H. Tarcza
*Assistant Examiner*—Daniel T. Pihulic
*Attorney, Agent, or Firm*—Jim Zegeer

[57] ABSTRACT

An ultrasonic measuring transducer system in which an ultrasonic transducer transmits an ultrasonic pressure wave and receives a return echo from a target and an electronic circuitry means converts the received pulses to arrange information to a target. The ultrasonic transducer is mounted in a wall of a plenum chamber. Air flow passages or apertures surround the ultrasonic transducer and air from a supply under pressure is connected to said plenum chamber. A temperature (or velocity of sound) measuring device is mounted in the plenum chamber for measuring the temperature from which the speed of sound in the medium is determined, and a measuring chamber forming tube surrounding the transducer and air outlet apertures provide a space in which air flow is maintained at a relatively constant rate and the temperature in substantially all of the measuring path and space between the target and said ultrasonic transducer is essentially the same as in the plenum chamber. The air apertures or passages are such that the pressure drop of air between said plenum chamber and the space in front of said transducer does not affect operation of the ultrasonic transducer. The measuring chamber forming tube is a cowl having a length which is less than the ring-down distance for said transducer at its operating frequency.

2 Claims, 2 Drawing Sheets

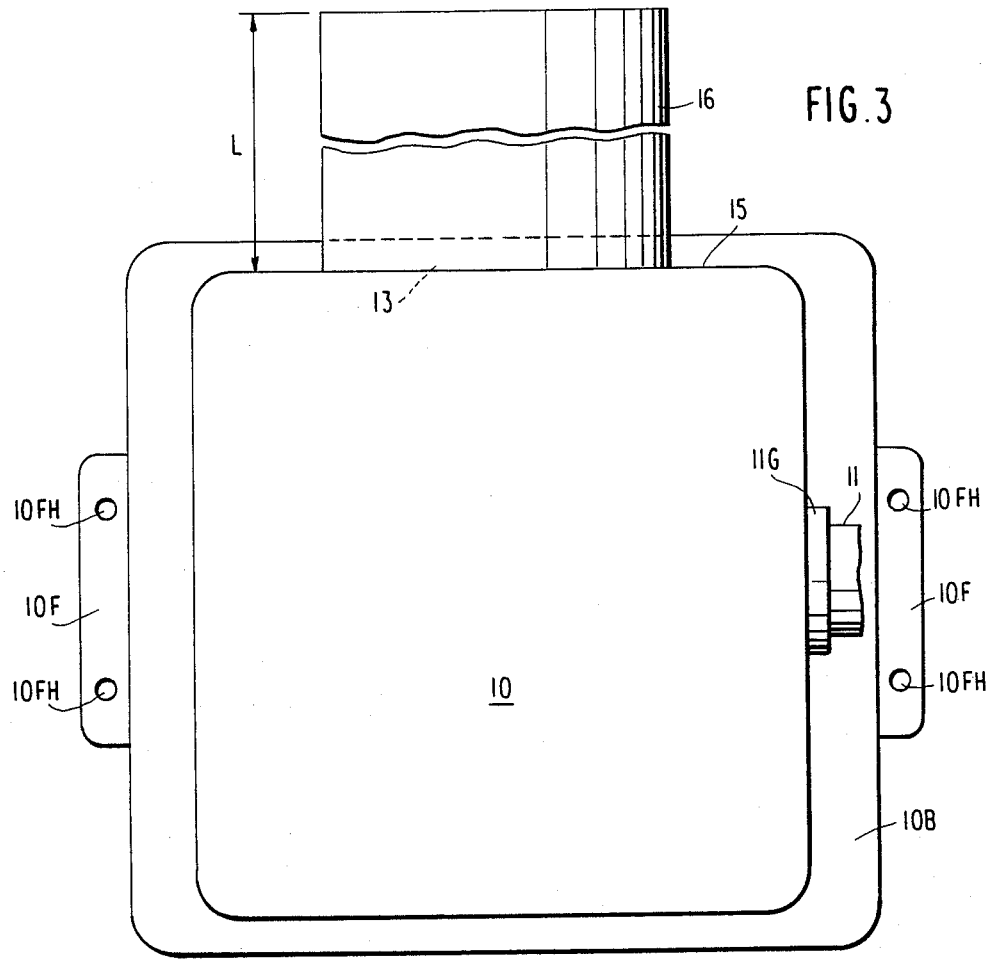
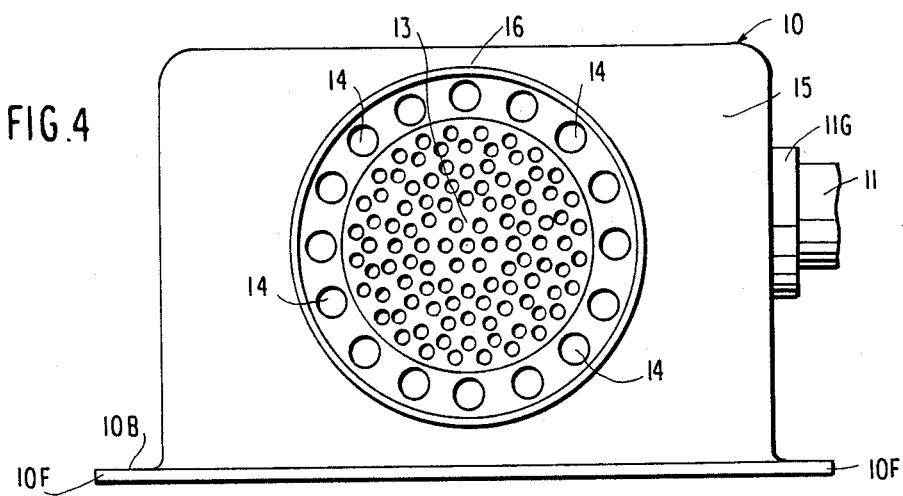

ULTRASONIC MEASURING DEVICE AND METHOD

BACKGROUND AND BRIEF DESCRIPTION OF THE INVENTION

It is well known in the art of ultrasonic measurements that where the ultrasonic pressure wave must travel through a given measuring path medium, air, for example, which may have one or more temperature gradients therealong, that the range measurements of ultrasonic pressure waves traveling from. An ultrasonic transducer to a target and back to the ultrasonic transducer can vary because the speed of sound traveling in the medium is affected by such temperature gradients. The media having two different temperatures are in effect two different medias to thereby cause a refraction of the pressure wave traversing one body of media having a first temperature to a second body of the same media having a different temperature.

According to the present invention, a flow of measuring path media, between the ultrasonic transducer and the target, provides a uniform temperature between the target and the ultrasonic transducer wherein the temperature (or velocity of sound in the medium in the plenum chamber) is measured in a plenum chamber prior to flowing of the medium in the measuring path. When the measuring path medium is air, it is transported through a path such that the volume of air between the source of issuing the air into the path between the transducer and the target is such that the mass tends to eliminate any sharp step rise in temperature of the air. As noted above, the temperature of the air is measured inside of a plenum chamber. One wall of the plenum chamber serves as a mounting surface for the ultrasonic transducer which may be of the Polaroid ™ type or a barium titanate, piezoelectric crystal, etc. A plurality of air flow apertures is framed around the transducer and the plenum chamber itself is coupled to a supply of ambient air. In this case, cowl or other chamber-forming means has a length which is less than the ring-down distance (which is equal to the CT/2 where C is the speed of sound in the medium, and T is time). The air flow buffers the temperature and, as noted above, thereby avoids quick temperature changes. According to the present invention measurement of the temperature (or velocity of sound in the medium at a given temperature) is done in the plenum chamber prior to the medium (air) exiting the apertures surrounding the ultrasonic transducer. The thermal mass of the supply system buffers changes in temperature. This location of the temperature (or velocity of sound sensor) rather than in the transducer to target path has been found to be most advantageous.

DESCRIPTION OF THE DRAWINGS

The above and other objects, advantages and features of the invention will become more apparent when considered with the accompanying drawings wherein:

FIG. 3 is a top plan view of an ultrasonic transducer assembly incorporating the invention, and FIG. 4 is an end view looking inside the cowling at the transducer and surrounding ring of apertures for air flow or air flow passages.

DETAILED DESCRIPTION OF THE INVENTION

Figure 1:
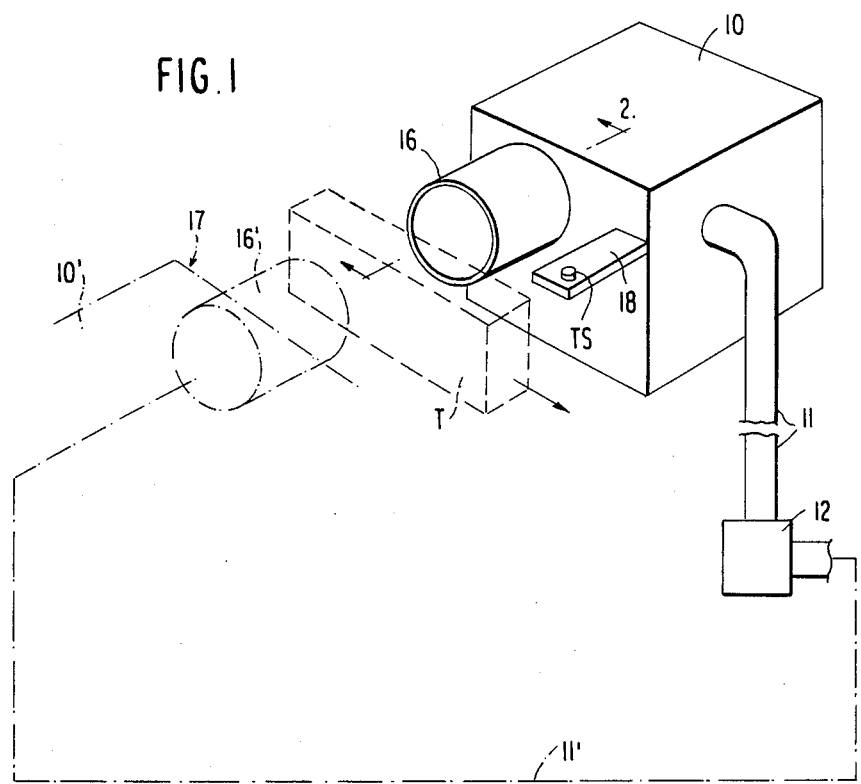
FIG. 1 is an isometric schematic view of an ultrasonic transducer system incorporating the invention.

Referring to FIG. 1, a plenum chamber 10 is coupled by a duct or passageway 11 to a supply 12 of air under pressure, and a second transducer assembly 17 may be coupled by a duct 11' to supply 12, the duct path lengths 11 and 11' being substantially equal and of sufficient length in conjunction with the volume of air in plenum chamber 10 and 17 that there is no step or sharp temperature change or gradient in the air being supplied to the plenum chambers and flowing into the chamber formed by cowling 16 in front of the transducers 13. A temperature sensor TS and preamp electronics board 18 is mounted in each plenum chamber 10. The temperature sensor is used to determine the speed of sound in the medium, but a speed of sound measuring device may be used in place thereof. The electrical cabling to the circuit board 18 and temperature sensor TS can pass through the duct 11, if desired.

In the embodiment shown in FIG. 1, the two transducers alternatively project ultrasonic pulses (typically in the 50kHz range), towards target T which, as indicated by the arrow, may be a moving or stationary target which is being gauged for thickness measurements. For measuring the distance between the target and the transducer, only one measurement need be made. It will be appreciated that the distance D between target T or the surface of target T and transducer 13 is measured by measuring the time of travel of an ultrasonic pulse to the target nd the reflection of its echo back to the transducer 13. In this system, the target T is relatively close to the outlet end of cowl 16 so that there is very little distance for change of air temperature between the end of cowl and the target and this assures that the air which flows is in position in front of in the path between the ultrasonic transducer 13 and the target is essentially of the same temperature as the air in the plenum chamber 10.

As noted earlier, the thermal mass or inertia of the system (conduit or duct 11, plenum 10, any air filter, etc.) is relatively high so as to buffer any change in temperature, that is, it allows a slow change in temperature to thereby avoid a step change which could adversely effect the measurements. The air flow is preferably filtered and of sufficient volume to sweep or scavenge the chamber in the cowl to remove contaminants. The temperature sensor TS which is preferably located in the same position as the preamplifier and electronic drivers 15 for the ultrasonic transducer 13E are located within the plenum chamber 10 and just in advance of the exit of the air through apertures 14.

Referring now to FIG. 3, the transducer 13 which is illustrated, is typically a Polaroid ™ type transducer (but may be piezoelectric) in which a metal screen or grill serves as part of the housing for a thin plastic membrane conductively coated on both sides and held in a position by a metal backing plate (not shown) so that when excited the ultrasonic wave that is generated is essentially a relatively narrow beam B. The air flowing through the apertures 14 has a pressure drop when passing through these apertures that does not affect the operation of the transducer and maintains the ultrasonic measuring path media of constant quality and temperature to thus enhance the measurement accuracy and, at the same time, scavenge the chamber of contaminants. (This scavenging function has been performed in a similar fashion in the prior art.)

Figure 2:
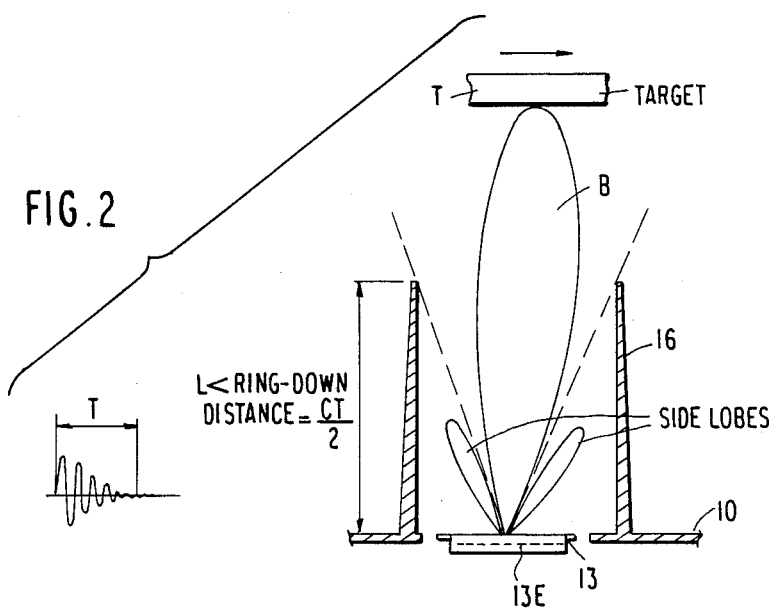
FIG. 2 is a schematic sectional view taken on lines 2—2 of FIG. 1.

As shown in FIG. 2, the cowling 16 which in this case is circular but may be of other shapes, has a length L which is less than the ring-down distance which is equal to CT/2. In the embodiment shown in FIGS. 3 and 4, the cowling has a length of about 2.2" and a diameter of about 2.2". The transducer 13 has a diameter of about 1.5" (or about approximately 5 wavelengths when the transducer is operated at a frequency of about 50 kHz).

While there has been shown and described a preferred embodiment of the invention, it will be appreciated that various modifications and adaptations will become readily apparent to those skilled in the art and it is intended to encompass such modifications within the spirit and scope of the claims appended thereto.

What is claimed is:

1. In an ultrasonic measuring transducer system in which an ultrasonic transducer transmits an ultrasonic pulses and receives return echoes from a target and an electronic circuitry means converts the received pulses to range information to said target, a plenum chamber, means mounting said transducer in a wall of said plenum chamber, means forming air outlet apertures surrounding said transducer, means supplying air under pressure to said plenum chamber, the improvement comprising, means in said plenum chamber for producing a signal corresponding to the speed of sound in the air in said plenum chamber, and a measuring chamber forming means mounted on the exterior of said wall of said plenum chamber and surrounding said air outlet apertures so as to provide a space in which air flow toward said target is maintained at a relatively constant rate and the temperature of the measuring path and space between said target and said ultrasonic transducer is maintained substantially the same as within said plenum chamber, said air outlet apertures being dimensioned such that the pressure drop of air between said plenum chamber and the space in front of said transducer does not affect operation of said transducer and said measuring chamber forming means is a cylindrical cowl having a length which is less than the ring-down distance for said transducer at its operating frequency.

2. In an ultrasonic measuring transducer system in which an ultrasonic transducer transmits an ultrasonic pulses and receives return echo pulses from a target and an electronic circuitry means converts the received echo pulses to range information to said target, a plenum chamber, means mounting said transducer in a wall of said plenum chamber, means forming air outlet apertures surrounding said transducer, means supplying air under pressure to said plenum chamber, the improvement comprising, means in said plenum chamber for producing a signal corresponding to the speed of sound in the air in said plenum chamber, and a hollow cylindrical cowl forming a measuring chamber mounted on the exterior of said wall of said plenum chamber and surrounding said air outlet apertures so as to provide a space in which air flow toward said target is maintained at a relatively constant rate and the temperature of the measuring path and space between the target and said ultrasonic transducer is maintained substantially the same as within said plenum chamber, said air outlet apertures are dimensioned such that the pressure drop of air between said plenum chamber and the space in front of said transducer does not affect operation of said transducer, and said hollow cylindrical cowl having a length which is less than the ring-down distance for said transducer at its operating frequency.

* * * * *